United States Patent
Escott

(10) Patent No.: US 7,657,668 B2
(45) Date of Patent: Feb. 2, 2010

(54) CLOCK SYNCHRONIZATION OF DATA STREAMS

(75) Inventor: Alex Escott, Vancouver (CA)

(73) Assignee: QNX Software Systems (Wavemakers), Inc., Vancouver (CA)

(*) Notice: Subject to any disclaimer, the term of this patent is extended or adjusted under 35 U.S.C. 154(b) by 77 days.

(21) Appl. No.: 11/504,948

(22) Filed: Aug. 16, 2006

(65) Prior Publication Data

US 2008/0043276 A1 Feb. 21, 2008

(51) Int. Cl.
*G06F 3/00* (2006.01)
*G06F 13/00* (2006.01)

(52) U.S. Cl. .................. 710/29; 710/8; 710/15; 710/52

(58) Field of Classification Search ............ None
See application file for complete search history.

(56) References Cited

U.S. PATENT DOCUMENTS

| | | | |
|---|---|---|---|
| 6,594,329 B1 | 7/2003 | Susnow | |
| 6,920,578 B1 | 7/2005 | Thompson et al. | |
| 2001/0014207 A1* | 8/2001 | Kawamura et al. | 386/95 |
| 2001/0040903 A1* | 11/2001 | Negishi et al. | 370/537 |
| 2006/0282566 A1* | 12/2006 | Virdi et al. | 710/52 |

FOREIGN PATENT DOCUMENTS

WO  WO 2004/063931 A2  7/2004

* cited by examiner

*Primary Examiner*—Tariq R. Hafiz
*Assistant Examiner*—Scott Sun
(74) *Attorney, Agent, or Firm*—Brinks Hofer Gilson & Lione

(57) ABSTRACT

A system synchronizes data flow between a first device and a second device. The system includes a data link that connects two or more devices that are capable of sending and receiving data through a bus. A capture device senses and transfer information through the bus. A ring buffer temporarily stores data transmitted through the bus. A read controller copies or reconstructs data in a length that is different from the length of the data received. A monitor detects underflow or overflow conditions into or out of the ring buffer and compensates for clock drift.

26 Claims, 9 Drawing Sheets

CLOCK SYNCHRONIZATION OF DATA STREAMS

BACKGROUND OF THE INVENTION

1. Technical Field

This application relates to timing, and more particularly, to synchronizing a data transfer between devices.

2. Related Art

Digital systems depend on coordinated communication between devices. Some systems depend on timing signals to determine when to examine an incoming stream of information. Distributing timing information may be a significant challenge. The timing signals may be generated, distributed, and synchronized to enable communication between sending and receiving devices.

Some systems use separate clocks to communicate between devices. When drift occurs, information may be lost as one device may not process information as fast as another. Some systems deliberately delete large blocks of information to compensate for some unwanted skews in clock rates. These processes lack a temporal occurrence. As large blocks of information are lost, artifacts may be introduced into data streams that disrupt or corrupt data streams. Data loss or changes may result in catastrophic events or faults that may affect not only the information being received but also the information being processed. Therefore, there is a need for a system that compensates for clock drift or skews without deleting large amounts of information.

SUMMARY

A system synchronizes data flow between a first device and a second device. The system includes a capture device configured to sense and transfer information. A synchronizer stores data received through the capture device. A read controller copies or reads data in lengths that are unequal to the length of the data received by the capture device. A monitor detects an underflow or an overflow condition into or out of the synchronizer and compensates for clock drift.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A synchronous system or application improves the exchange of information between devices through a communication medium. The device or application may comprise a hardware device or a program that may provide data to and receive data from one or more devices. The system allows data to be communicated at a predetermined length including large block sizes without affecting the operation of a controller, a processor, a synchronizer, or a memory that may receive or process the data. Some systems provide a fine resolution or a very fine resolution (that may be as small as a single digital sample) compensation that may be controlled by the user in some systems and applications, or may occur automatically. Some systems provide frequently timed synchronizations that minimize the affects of compensation. Monitoring or self-monitoring software or hardware in some systems may detect differences in the rate data is received and processed. Some monitoring systems or software modules may predict a time or interval when compensation may occur and schedule a compensation. A planned synchronization may improve performance and/or reliability of some systems.

Figure 1:
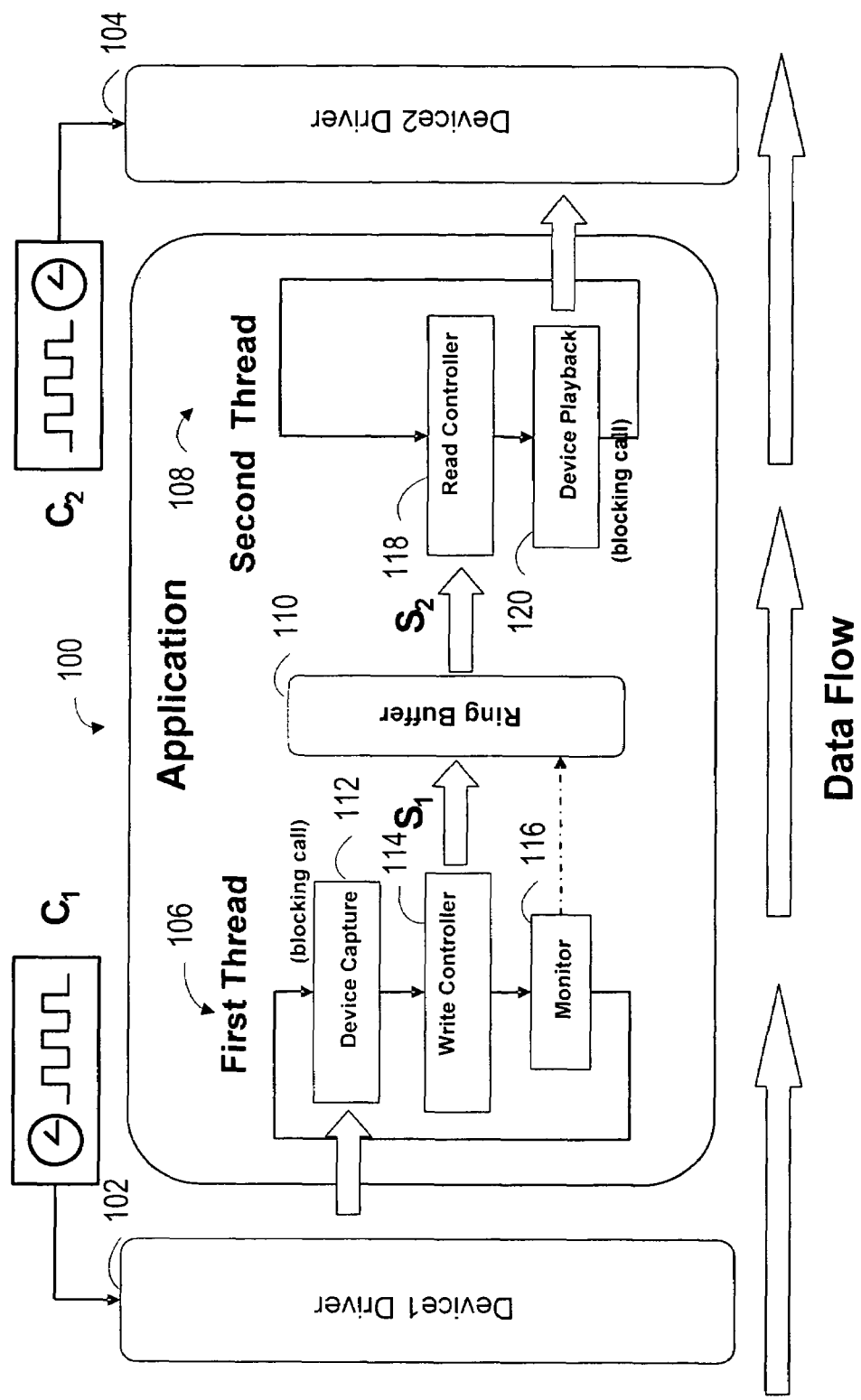
FIG. 1 is a synchronization system coupled to device drivers.

FIG. 1 is a synchronization system or application 100 coupled to a first and a second device driver 102 and 104. In FIG. 1, the device drivers 102 and 104 comprise a hardware device or a software component that facilitate communication. These device drivers 102 and 104 may include a translator that may be coupled to an adapter. The translator translates language or data formats into one or more languages or formats to ensure operative compatibility between one or more devices. The timing that determines the sequence in which operations are executed by the device drivers 102 and 104 may comprise two or more clocks. In FIG. 1, a first clock C1 and a second clock C2 generate a steady stream of timing pulses that allow data to be shared. In some synchronization systems or applications the device drivers 102 and 104 do not share or exchange timing information.

The synchronization system or application 100 operates through two threads. In FIG. 1, the threads comprise two asynchronous software routines or hardware threads. A first thread 106 blocks (waits) on a reading call to the first device driver 102, the second thread 108 blocks on the writing call to a second device driver 104. These threads 106 and 108 push and pull data to and from a buffer, such as a ring buffer 110 that temporarily stores data. In some systems the ring buffer 110 comprises a first-in, first-out storage device that provides access so that a calling, reading, or monitoring, or self-monitoring device or program may construct and/or parse data. The ring buffer 110 may comprise a contiguous block of memory or it may be spilt among different memories (e.g., noncontiguous) that may be read from and written to. In some systems, the ring buffer 110 provides direct memory access, which comprises memory access that does not involve a processor and may transfer data directly between memory and a peripheral device. In some alternate systems, the ring buffer 110 may include overflow logic (e.g., hardware or software)

that may initiate a block on the reading call. In some synchronization applications and systems 100, the overflow logic may prevent an access pointer from moving out of a predetermined address range managed by the ring buffer 110. In these synchronization applications and systems 100, the overflow logic may be disabled if desired through a software instruction or hardware selection.

A first capture device 112 communicates with the first device driver 102 through an input bus. The first capture device 112 may sense and transfer information to a write controller 114 that may write to the ring buffer 110 through an internal bus. If the first and second clock C1 and C2 are operating at identical frequencies, the monitoring or self-monitoring software or hardware 116 may detect a constant data length stored within the ring buffer 110. When the clock rates are not equal or are operating at different rates or frequencies, the amount of data stored in the ring buffer 110 may increase or decrease depending on the speeds of the clocks C1 and C2.

As data flows into the ring buffer 110, it may be read through the internal bus by a read controller 118. The read controller 118 may be configured to re-construct or copy the stored data and transmit that data to the second device driver 104 through an output bus. The software or device that comprises the read controller 118 may re-construct or replicate the data and send the data at a predetermined or a desired length to the second device driver 104.

Figure 2:
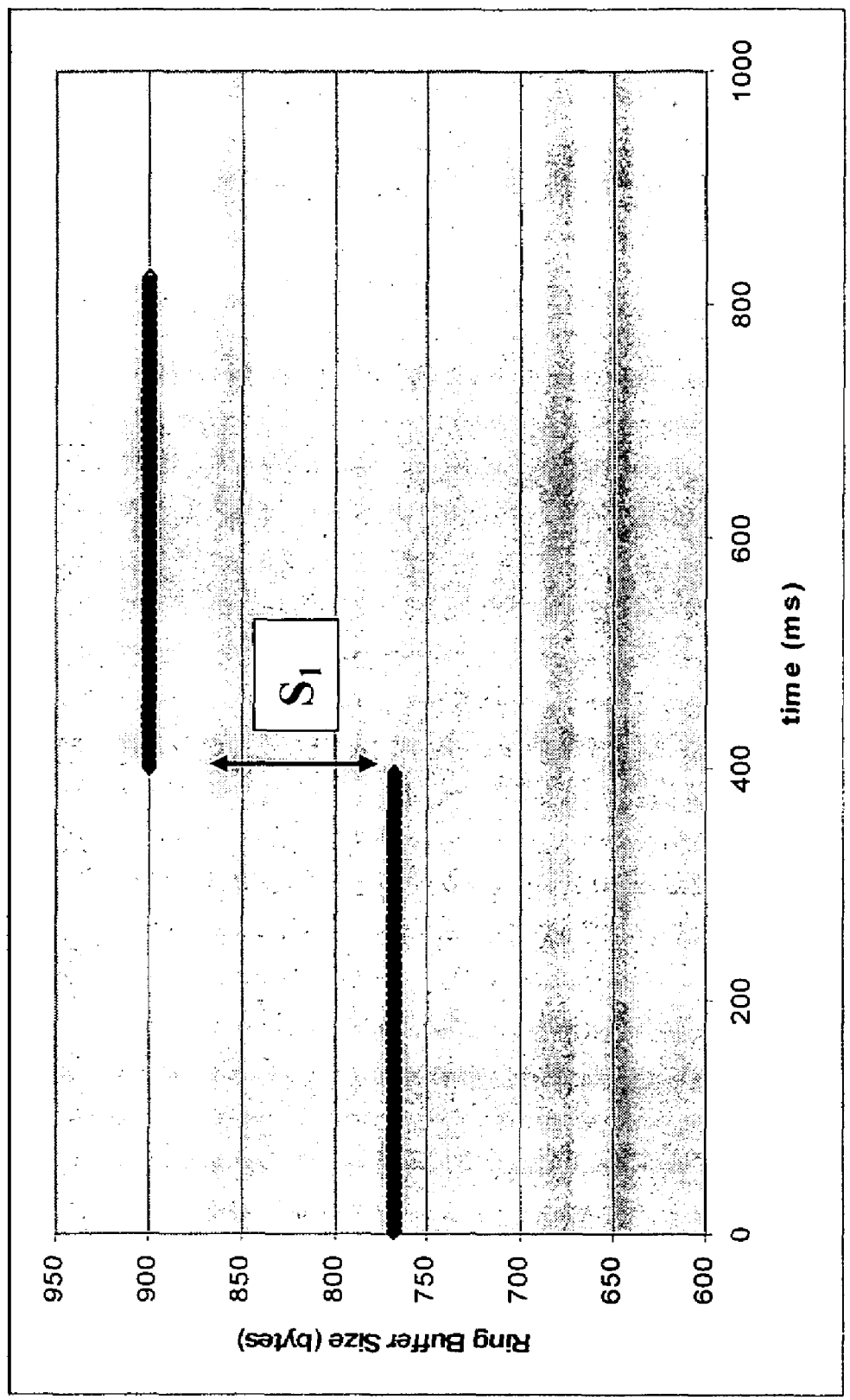
FIG. 2 shows the ring buffer size versus time for equal block sizes.

Some synchronization systems or applications 100 may receive and send information in substantially equal lengths. In these systems and applications 100 the monitoring or self-monitor software or hardware 116 may detect or observe a change in the size of the ring buffer 110 at a resolution that is about the size of the length of data that is received or transmitted. In FIG. 2, the resolution is designated "s1." Since a change may be only observed every "s1" lengths, such as bytes (corresponding to a predetermined amount of time, depending on the sampling rate and bit resolution), clock drift compensation may be applied to the data stream at intervals that the data is transmitted, or processed, or received. In FIG. 2, the intervals may be a multiple of or divisible by an "s1" length. Imperfect timing conditions in some synchronization systems or applications may cause an underflow or overflow of data. In some situations, the insertion, replication, and/or removal of large blocks or units of data may disrupt the system or application.

Figure 3:
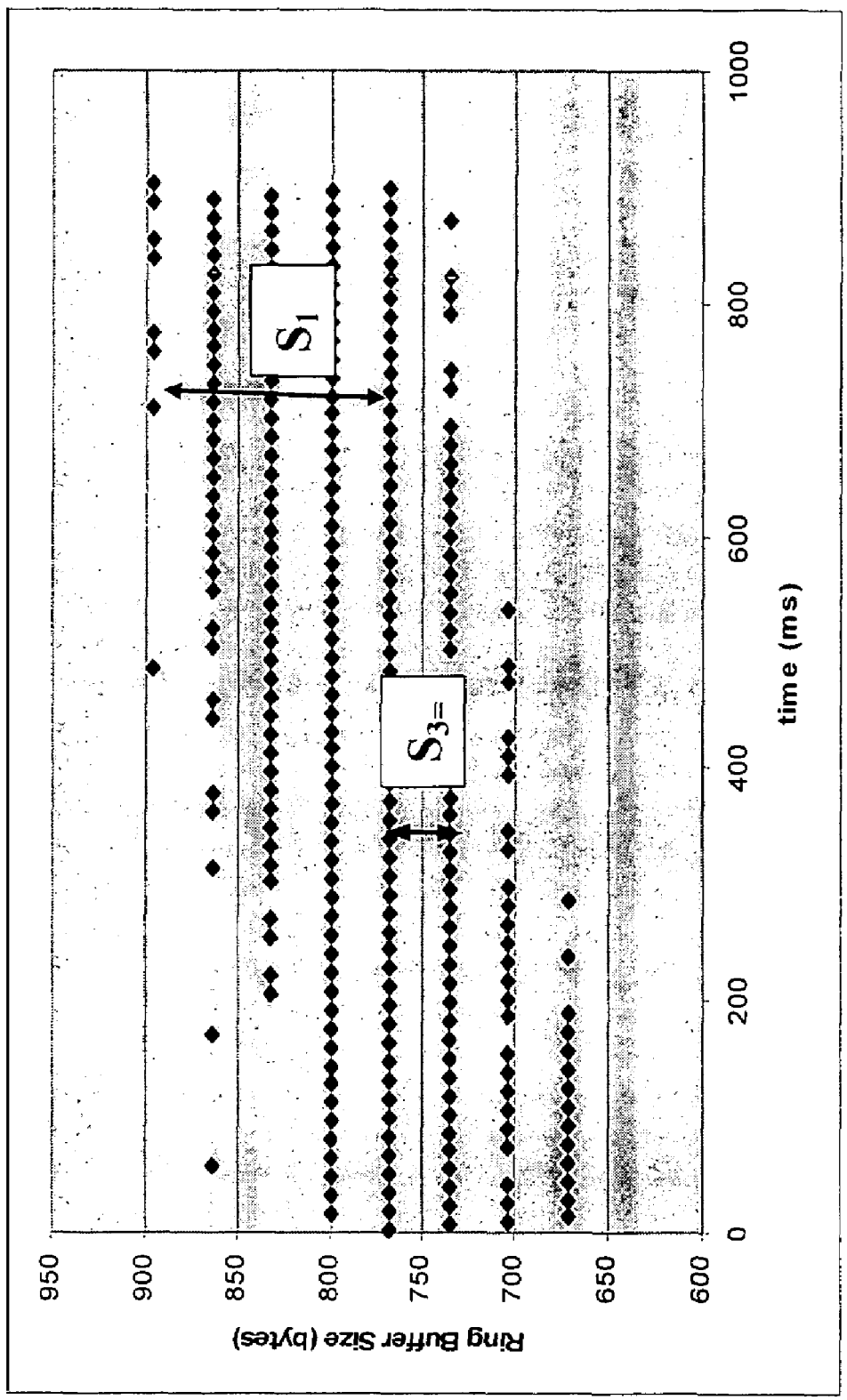
FIG. 3 shows the ring buffer size versus time for unequal block sizes.

In an alternate synchronization system or application 100 also shown in FIG. 1, the system and application are configured to break up data streams of data or packets of data into uneven or different block sizes of data. In this alternative the size of the data written to the ring buffer 110 (e.g., block sizes in this explanation) may not equal the size of the data reconstructed or copied from the ring buffer 110. In the system or application 100, both of the threads 106 and 108 are in communication with a device driver 102 and 104, respectively. The first thread 106 communicates with the first device driver 102 and the second thread 108 communicates with the second device driver 104 through repetitive software or communication loops. Through the first capture device 112, the first thread 106 captures blocks of data through the input bus. Through an internal bus, the write controller 114 writes this information into the ring buffer 110 in s1 block lengths at C1 intervals. Because a read controller 118 is reading and copying or reconstructing chunks of data in different lengths than the length of the data written to the ring buffer 110, the monitor or self-monitor (e.g., a software component or a hardware device) 116 may detect an overflow or underflow of data flowing into or out of the ring buffer 110. In FIG. 3, the self-monitor 116 detected an increase in the amount of data stored in the ring buffer 110 in time. When the length of the blocks or frames of data read from the ring buffer 110 s2, is greater than the length of the blocks or frames of data written to the ring buffer 110, s1, a compensation factor s3 may be calculated by equation 1 in some systems and applications. In FIG. 3, the dividend comprises s1 and the divisor comprises s2.

$$S3 = \text{remainder}(s2/s1) \text{ (where } s2 > s1\text{)} \quad \text{equation 1}$$

The monitor or self-monitor 116 may derive the time to compensate for these differences. One system or application tracks the amount of data stored in the ring buffer and calculates an N-point windowed average, N shown in equation 2.

$$N = ((s2/s3) - 1) \quad \text{equation 2}$$

Figure 4:
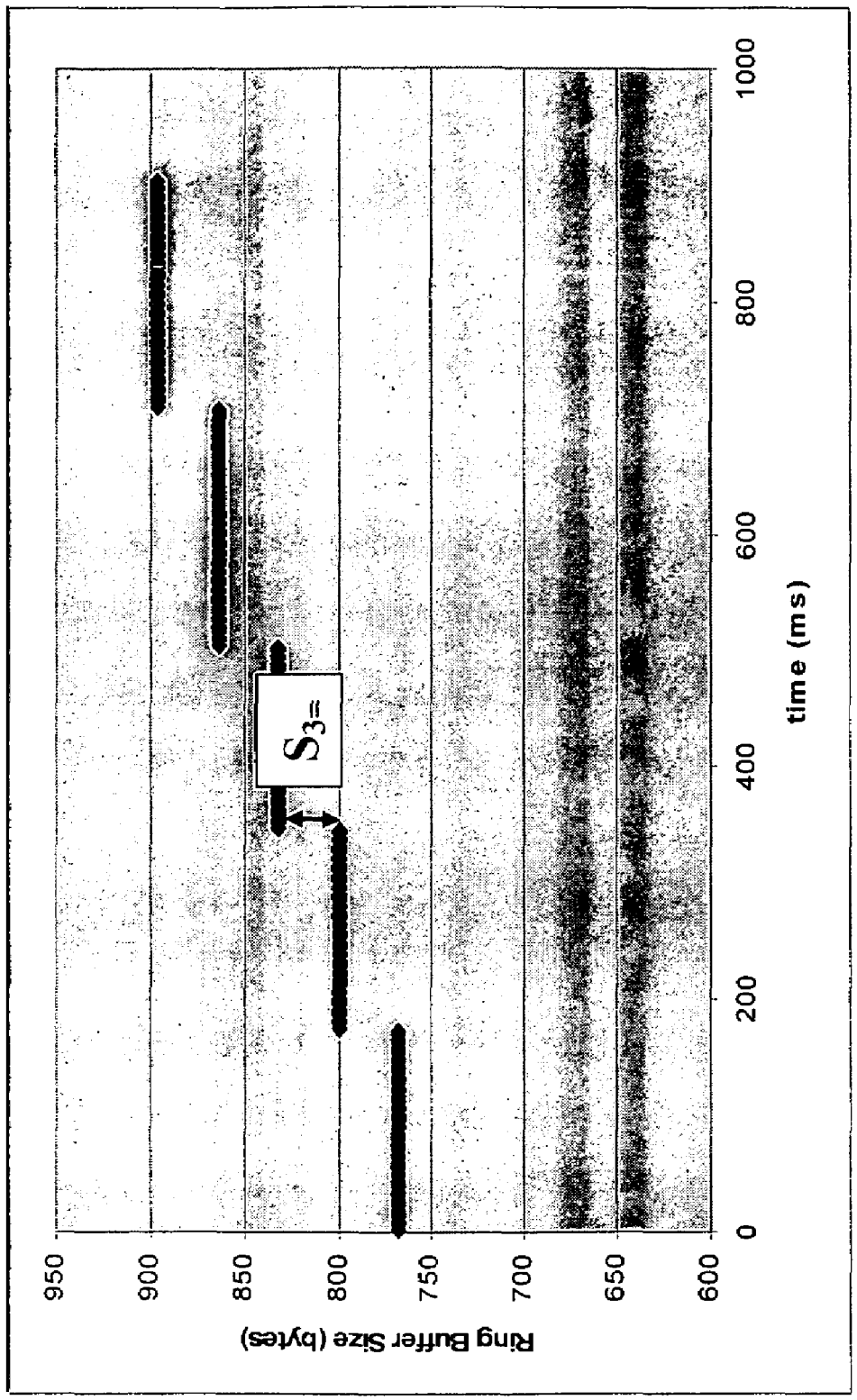
FIG. 4 is the windowed average over time of FIG. 3.

As seen in FIG. 4, the drift between the two clocks may be observed at a resolution of s3 bytes. Since s3 is derived from the two blocks or frame sizes s1 and s2 that may be selected by the user or determined by the system or application design; any desired resolution of compensation of clock drift may be obtained. The system may compensate for the clock drift by inserting or removing (again, dependent on relative speeds of the two clocks in some systems and applications) data in the ring buffer. Since S3 may be as small as desired, the resulting disruption to the data stream may be minimized.

Figure 5:
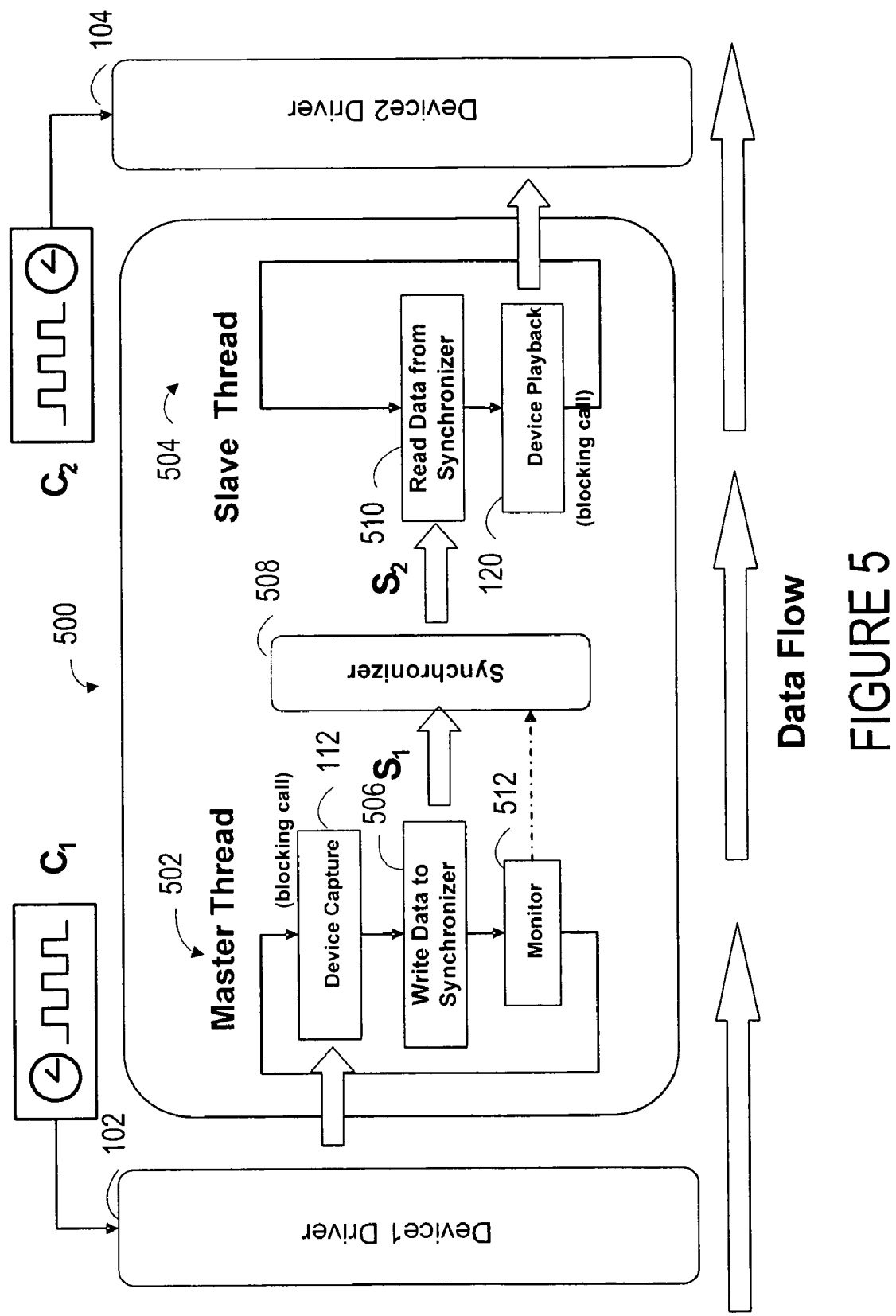
FIG. 5 is an alternate synchronization system coupled to device drivers.

FIG. 5 is an alternative synchronization system or application 500. This system or application 500 is configured in a master/slave arrangement, in which one thread, called the master thread 502 controls another thread called the slave thread 504. In FIG. 5 a capture device 112 communicates with the first device driver 102 through an input bus. The capture device 112 may detect and send blocks or frames of data to a write controller 506 that may write the blocks or frames of data to a synchronizer 508. The synchronizer 508 may comprise a storage device that compensates for differences between the rates at which information is processed in two, three, four, or more devices. When the timing signals driving the device drivers 102 and 104 occur at different frequencies, a monitor 512 (e.g., software routine or hardware module) may detect the changing storage capacity within the synchronizer 508. When different block sizes are written to or read from the synchronizer 508, the monitor 512 may observe changes in the storage use. If overflow is occurring, or in the alternate, is likely to occur, or is about to occur, the monitor 512 may transmit a blocking call that prevents the capture device 112 from grabbing data from the first device driver 102. Alternatively, or in combination, the monitor 512 may instruct the synchronizer 508 to write over stored blocks or frames of data or may direct the write controller 506 to write to an ancillary memory that may be remote but in communication with the synchronizer 508. If an underflow is occurring, or in the alternate, is likely to occur, or is about to occur, the monitor 512 may prevent the playback device 120 from transmitting information to a device driver 104 by transmitting a second blocking call; or in the alternative, may instruct the playback device 120 to repeat or replicate a block of data or frame until the underflow condition mitigates or ends.

In operation, data flow into the synchronizer 508 may be read through the internal bus by a read controller 510. If the synchronization system or application 500 is not compensating for an overflow or underflow condition, the read controller 510 may copy or re-construct the output data and transmit that data through an output bus to one or more devices or device drivers without compensation. Communication may occur through the internal bus, read controller 510, playback device 120, and an output bus. Alternatively, the compensation and transmission processes may occur simultaneously or almost simultaneously, or at different times.

Figure 6:
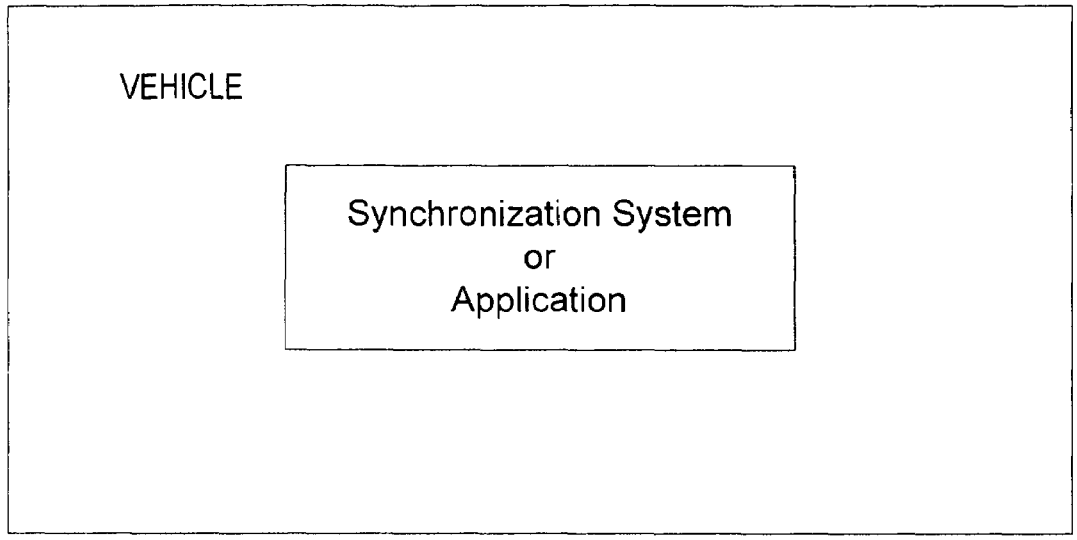
FIG. 6 is a synchronization system in communication with or coupled to a vehicle.
Figure 7:
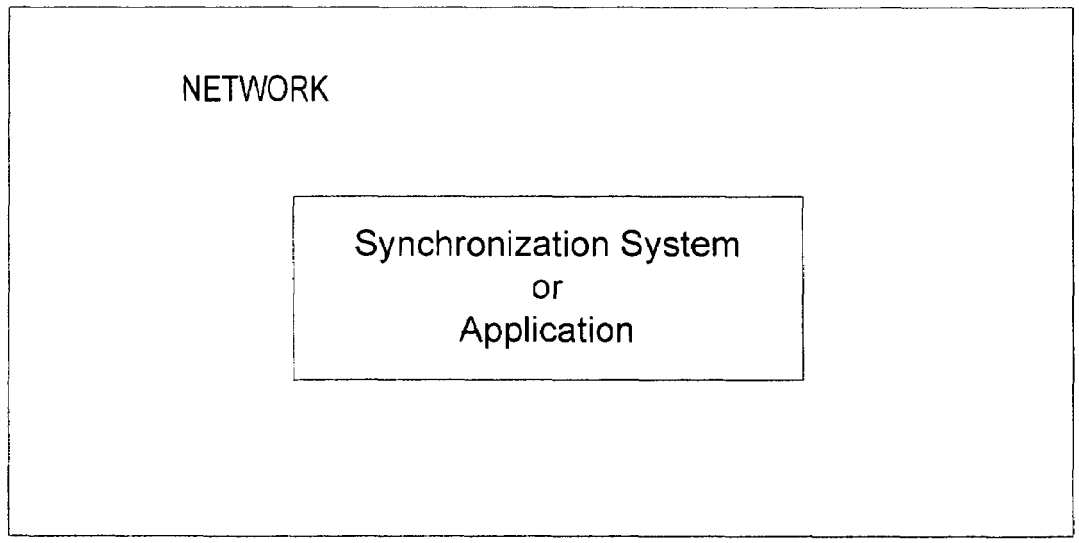
FIG. 7 is a synchronization system in communication with or coupled to a network.
Figure 8:
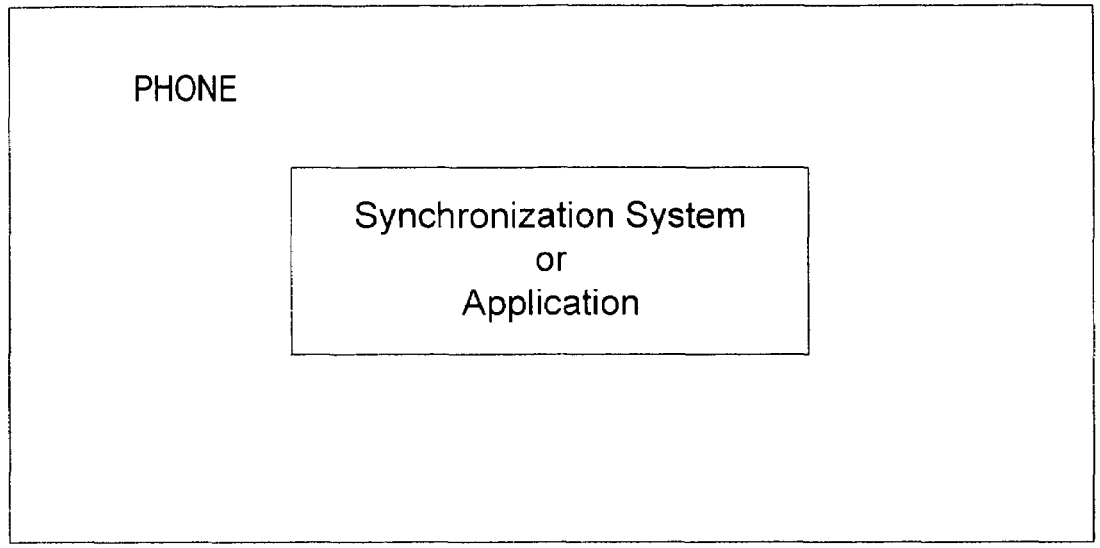
FIG. 8 is a synchronization system in communication with or coupled to a phone.
Figure 9:
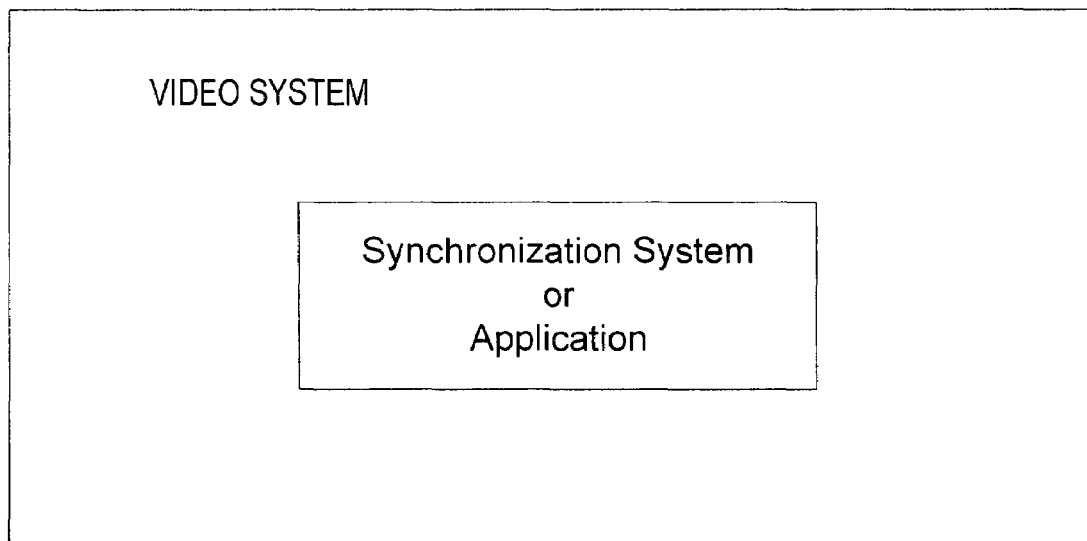
FIG. 9 is a synchronization system in communication with or coupled to a video system.
Figure 10:
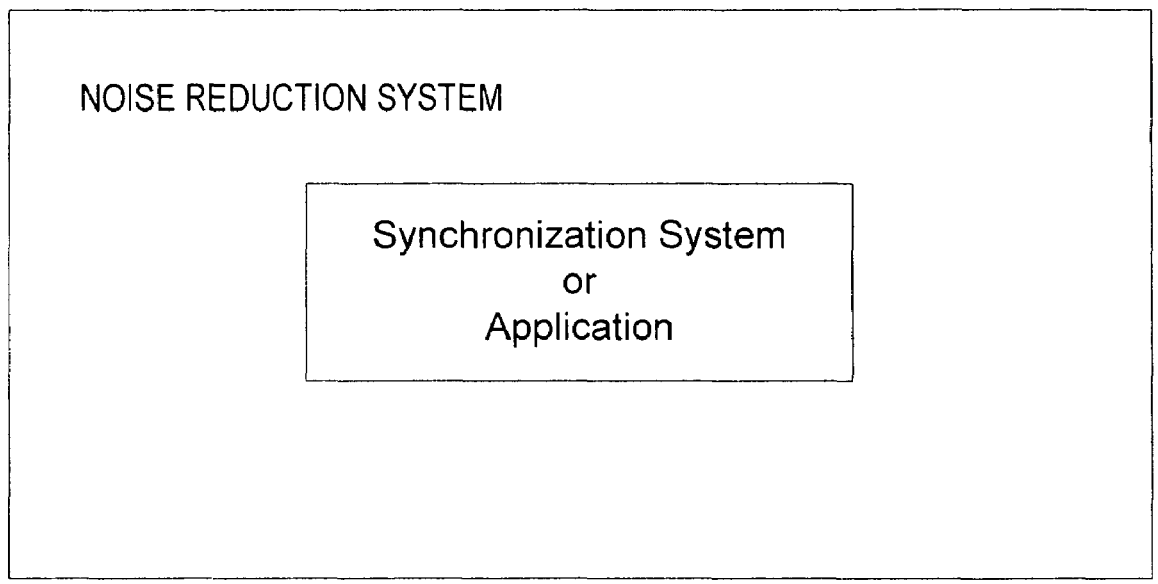
FIG. 10 is a synchronization system in communication with or coupled to a noise reduction system.

The synchronization systems and applications 100 and 500 are adaptable to many devices, device drivers, and interfaces (e.g., a point to which connection is made). Some speech synchronization systems or applications interface, communicate with, or couple devices or structures for transporting person or things (e.g., a vehicle as shown in FIG. 6), publicly or privately accessible networks as shown in FIG. 7, instruments that convert voice and other sounds into a form that may be transmitted to and reconstructed at remote locations, such as landline and wireless phones and audio systems as shown in FIG. 8, video systems as shown in FIG. 9, noise reduction systems FIG. 10, and other mobile or fixed systems that may be susceptible clock drift including navigation systems. The synchronization systems or applications may interface portable analog or digital audio and/or video players (e.g., such as an iPod®), navigation systems, or multimedia systems that include or interface speech enhancement systems or retain speech enhancement logic. The synchronization systems and applications may also synchronize data transfers within digital signal processing systems that implement some or all of the components of the systems described above.

Figure 11:
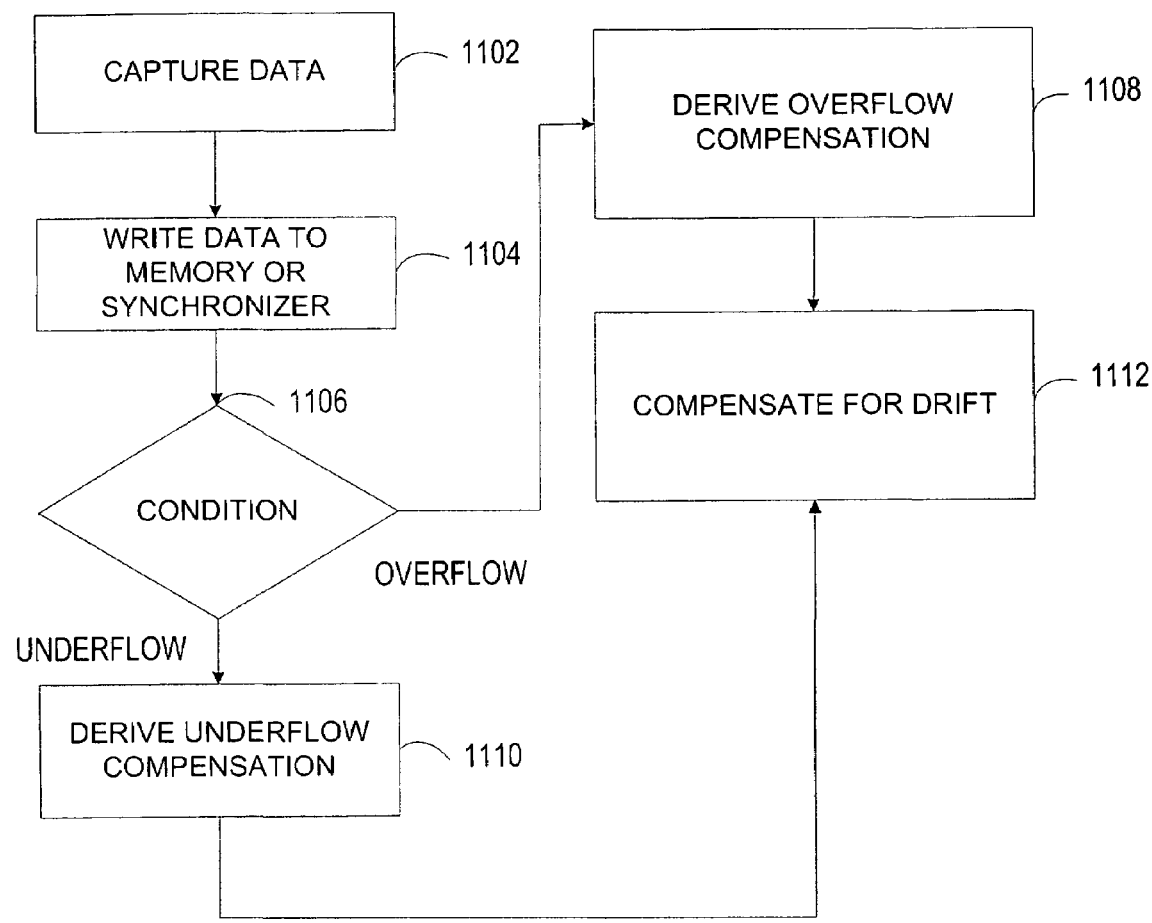
FIG. 11 is a synchronization process.

FIG. 11 is a flow diagram of a synchronization process that may synchronize data transfer between two or more devices. When used in digital signal processing technology, the process may compensate for clock drift through as little as one digital sample and may synchronize the data streams at frequent intervals that may be programmed by a user, may occur automatically, or may occur at asynchronous times. The methods may break up data streams or packets of data into uneven or different block sizes of data (some may be substantially or nearly equal in length). In the synchronization process shown in FIG. 11, the size of the data written to the ring buffer, synchronizer, or storage device, respectively (e.g., block sizes in this explanation) does not equal the size of the data reconstructed or copied from the ring buffer, synchronizer, or storage device, respectively. In FIG. 11, threads are in communication with devices that may include interfaces or device drivers. A first thread communicates with a first device and a second thread communicates with a second device. Communication through the threads may occur repeatedly until a condition is detected. In FIG. 11, the condition may comprise a lack of data flow or another condition that may be programmed.

At 1102 data is captured. The data may comprise a block or frames of data received from one or more devices. Through one or more hardware paths data is written into the ring buffer, synchronizer, or storage device in block lengths at timed intervals at 1104. Because data is reconstructed or copied in different lengths than the data written to the ring buffer, synchronizer, or storage device, the monitor or self-monitor (e.g., software routine or hardware device) may detect the overflow or underflow of data flowing into or out of the ring buffer at 1106. In FIG. 11, the self-monitor may detect an increase in the amount of data stored in the ring buffer, synchronizer, or storage device in time. When the length of the blocks or frames of data read from the ring buffer, synchronizer, or storage device s2 is greater than the length of the blocks of blocks of data or frames of data written to the ring buffer, synchronizer, or storage device, s1, a compensation factor s3 may be derived at 1108. While any factor may be derived, one factor may be calculated in some processes by equation 1. In equation 1, the dividend comprises s1 and the divisor comprises s2.

$$S3 = \text{remainder}(s2/s1) \text{ (where } s2 > s1) \quad \text{equation 1}$$

The monitor or self-monitor may derive the time to compensate for these differences at 1108. One method may track the ring buffer, synchronizer, or storage devices size and calculating an N-point windowed average, N shown as equation 2.

$$N = ((s2/s3) - 1) \quad \text{equation 2}$$

The drift between the two clocks may be observed at a resolution of s3 bytes. Since s3 is derived from the two block or frame sizes s1 and s2—that may be selected or programmed by the user or determined by the system or application design; any desired resolution in clock drift nay be obtained. The method may then compensate for the clock drift by inserting data (e.g., exemplary compensation for an underflow condition 1110) removing data, deleting data, parsing data (again, that may dependent on relative speeds of the two clocks in some methods) read from the ring buffer, synchronizer, or storage device to an output at 1112. Since S3 may be as small as a user desires, the resulting disruption to the data stream may be minimized.

The method of FIG. 11 may be encoded in a signal bearing medium, a computer readable medium such as a memory, programmed within a device such as one or more integrated circuits, one or more processors (e.g., a device capture processor, write controller processor, monitor processor, read controller processor, playback control processor in communication with each or some of the processors) or processed by a controller or a computer. If the methods are performed by software, the software may reside in a memory resident to or interfaced to a storage device, synchronizer, a communication interface, or nonvolatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above-described synchronization system or method may be selected or programmed by the user or determined by the system or application design. Any desired resolution of compensation may be obtained by the system, application, or method at asynchronous or synchronous intervals. The system may compensate for the clock drift by inserting, removing, deleting, parsing data or a combination in a main or auxiliary storage device. The desired resolution of the compensation may be as small as a user or programmer desires. Any resulting disruption to the data stream may be minimized.

The system or application improves the exchange of information between devices through a communication medium. The system allows data to be communicated at a predetermined length including large block sizes without affecting a device that may receive or process the data. Some systems provide a fine resolution or a very fine resolution (that may be as small as a single digital sample) compensation that may be controlled by the user in some systems and applications, or may occur automatically. Some systems provide a frequently timed re-occurring synchronization that minimizes the affects of compensation. Monitoring or self-monitoring software or hardware in some systems may detect differences in the rate data is received and processed. Some monitoring systems or software modules may predict a time or interval when compensation may occur and schedule compensations.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system that synchronizes data flow between a first device and a second device comprising:
   a data link that couples two or more devices that are capable of sending and receiving data through a bus system;
   a capture device in communication with the data link configured to sense and transfer information through the bus system;
   a ring buffer in communication with the capture device that temporarily stores data received by the data link;
   a write controller that writes data to the ring buffer;
   a read controller in communication with the ring buffer that copies or reconstructs data in a second length that is different from a first length of data received by the capture device;
   a playback device that transmits data to an output port; and
   a monitor that detects an underflow or an overflow condition into or out of the ring buffer and compensates for a clock drift by transmitting a blocking call to the capture device when an overflow condition is detected and compensates for the clock drift by transmitting a blocking call to the playback device when an underflow condition is detected.

2. The system of claim 1 where the data link comprises an external bus.

3. The system of claim 1 further comprising a device driver in communication with the data link.

4. The system of claim 1 where the device driver comprises a translator that translates a data format into a different data format to ensure operative compatibility between two different devices.

5. The system of claim 1 where the ring buffer comprises a first-in, first out storage device.

6. The system of claim 1 where the monitor is configured to construct or parse data to be transmitted by the playback device.

7. The system of claim 1 where the capture device is configured to receive data processed at a different rate than the rate the data is transmitted by the playback device.

8. The system of claim 1 where the ring buffer comprises a contiguous block of memory.

9. The system of claim 1 where the ring buffer comprises a non-contiguous block of memory.

10. The system of claim 1 where the ring buffer comprises overflow logic that prevents an access pointer from moving out of a predetermined memory address range.

11. The system of claim 10 where the overflow logic is configured to be disabled through a software instruction.

12. The system of claim 1 where the monitor is configured to derive a compensation time through a windowing function.

13. The system of claim 1 where the monitor compensates for the clock drift at a synchronous basis.

14. The system of claim 1 where the monitor compensates for clock drift at a asynchronous basis.

15. A system that synchronizes data flow between a first device and a second device comprising:
   a capture device in communication a data link configured to sense and transfer information;
   a synchronizer in communication with the capture device that stores data received through the capture device;
   a read controller in communication with a ring buffer that copies data in a second length that is different from a length received by the capture device; and
   a monitor that detects an underflow or an overflow condition into or out of the synchronizer and compensates for a clock drift by transmitting a blocking call to the capture device when an overflow condition is detected and compensates for the clock drift by transmitting a blocking call to a playback device when an underflow condition is detected.

16. The system of claim 15 where the capture device is in communication with a device driver where the device driver comprises a translator that translates a data format into a different data format to ensure operative compatibility between two different devices.

17. The system of claim 15 where the monitor compensates for clock drift at a asynchronous interval.

18. The system of claim 15 where the synchronizer is coupled to a vehicle.

19. The system of claim 15 where the synchronizer is coupled to a publicly accessible network.

20. A system that synchronizes data flow between a first device and a second device comprising:
   a capture device in communication with a data link configured to sense and transfer information;
   a synchronizer in communication with the capture device that stores data received through the capture device;
   a read controller in communication with the synchronizer that copies data in a second length that is different from a length received by the capture device; and
   means that detects an underflow or an overflow condition into or out of the synchronizer and compensates for a clock drift by transmitting a blocking call to the capture device when an overflow condition is detected and compensates for the clock drift by transmitting a blocking call to a playback device when an underflow condition is detected.

21. The system of claim 20 where the capture device is in communication with a device driver where the device driver comprises a means that translates a data format into a different data format to ensure operative compatibility between two different devices.

22. The system of claim 20 where the means that detects the underflow or overflow condition compensates for clock drift at an asynchronous interval.

23. The system of claim 20 where the synchronizer is coupled to a vehicle.

24. The system of claim 20 where the synchronizer is in communication with a publicly accessible network.

25. A system that synchronizes data flow between a first device and a second device comprising:
- a capture device in communication with a data link configured to sense and transfer information;
- a synchronizer in communication with the capture device that stores data received through the capture device;
- a read controller in communication with the synchronizer that copies data in a second length that is different from a length received by the capture device; and
- a monitor that detects an underflow or an overflow condition into or out of the synchronizer and compensates for a clock drift by transmitting a blocking call to the capture device when an overflow condition is detected and compensates for the clock drift by transmitting a blocking call to a playback device when an underflow condition is detected;

where the monitor is configured to transmit the blocking call to the capture device to prevent the capture device from obtaining data from the first device, where the monitor is configured to transmit the blocking call to the playback device to prevent the playback device from transmitting data to the second device.

26. A data synchronization system, comprising:
- a capture device that receives data from a first external device;
- a playback device that sends data to a second external device;
- a buffer in communication with the capture device and the playback device, where the buffer stores data received from the first external device and provides data to the playback device for transmission to the second external device; and
- a buffer monitor configured to transmit a blocking call to the capture device to prevent the capture device from obtaining additional data from the first external device in a buffer overflow condition, where the buffer monitor is configured to transmit a blocking call to the playback device to prevent the playback device from transmitting additional data to the second external device in a buffer underflow condition;

where the capture device, playback device, buffer, and buffer monitor comprise portions of a unitary device that provides a data flow interface between the first external device and the second external device.

* * * * *

UNITED STATES PATENT AND TRADEMARK OFFICE
CERTIFICATE OF CORRECTION

PATENT NO. : 7,657,668 B2  Page 1 of 1
APPLICATION NO. : 11/504948
DATED : February 2, 2010
INVENTOR(S) : Alex Escott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 247 days.

Signed and Sealed this

Twenty-eighth Day of December, 2010

David J. Kappos
*Director of the United States Patent and Trademark Office*